(12) United States Patent
Zierten

(10) Patent No.: US 7,674,091 B2
(45) Date of Patent: Mar. 9, 2010

(54) ROTOR BLADE PITCH CONTROL

(75) Inventor: Daniel T. Zierten, Sewell, NJ (US)

(73) Assignee: The Boeing Company, Chicago, IL (US)

(*) Notice: Subject to any disclaimer, the term of this patent is extended or adjusted under 35 U.S.C. 154(b) by 785 days.

(21) Appl. No.: 11/559,651

(22) Filed: Nov. 14, 2006

(65) Prior Publication Data

US 2008/0111399 A1    May 15, 2008

(51) Int. Cl.
*B64C 11/06* (2006.01)

(52) U.S. Cl. .................. 416/1; 416/163; 244/17.25

(58) Field of Classification Search .............. 416/1, 416/159, 163, 170 R; 244/17.25
See application file for complete search history.

(56) References Cited

U.S. PATENT DOCUMENTS

| | | | | |
|---|---|---|---|---|
| 4,379,678 | A | * | 4/1983 | Carlock et al. ............... 416/98 |
| 4,519,743 | A | * | 5/1985 | Ham ............................ 416/1 |
| 4,534,704 | A | | 8/1985 | McArdle |
| 4,573,873 | A | * | 3/1986 | Yao et al. .................... 416/114 |

FOREIGN PATENT DOCUMENTS

| | | |
|---|---|---|
| EP | 0 250 135 | 12/1987 |
| EP | 0 729 883 | 9/1996 |
| GB | 2 043 010 | 10/1980 |

* cited by examiner

*Primary Examiner*—Edward Look
*Assistant Examiner*—Aaron R Eastman
(74) *Attorney, Agent, or Firm*—Haynes & Boone, LLP.

(57) ABSTRACT

A mechanical independent blade control (MIBC) mechanism for controlling the pitch of each of the blades of a rotor blade system or a main rotor of a rotor aircraft independently of the other blades includes a plurality of actuators disposed in the fuselage below the hub of the rotor, each being operable to selectively control the pitch of an associated one of the blades independently of the other blades, and a plurality of mechanical linkages disposed within the annulus of the rotor mast, each coupled between a blade and an actuator and operable to transmit a force output by the actuator to a pitch horn fixed to an inner end of the associated blade. The mechanism enables the direction of pitch of each blade to be changed more than twice during one revolution of the rotor.

20 Claims, 3 Drawing Sheets

ROTOR BLADE PITCH CONTROL

BACKGROUND

This invention relates to rotor blade systems and rotor aircraft, such as helicopters, in general, and in particular, to a mechanism that enables the pitch of each of the blades of the main rotor of the aircraft to be controlled individually and independently of the others.

As illustrated in the partial perspective view of FIG. 1, most rotor aircraft, such as helicopters, include one or more power driven main rotors 1 that are equipped with a hub 2 rotatably supported on a rotor mast 5 and having a plurality of elongated blades 3 extending radially outward from it, each of which has an airfoil cross-section (not illustrated) and is coupled to the hub at the inner end thereof by three hinges 4 that enable the blade to rotate about three axes relative to the hub, i.e., to "flap" up and down, to "lag" forward and aft, and to "pitch" up and down and thereby change its angle of attack relative to the stream of air moving past it.

To move the aircraft vertically, the respective pitches of the rotating blades are all changed simultaneously, or "collectively," which is effected by a "collective pitch lever" coupled to the blades through a rotating "swash plate" that is coupled to the blades by respective linkages.

On the other hand, horizontal movement of the aircraft is achieved by tilting the rotor such that the thrust of the rotor resolves into two components, a "lift" component that supports the weight of the aircraft, and a "horizontal thrust" component that propels the aircraft horizontally in the desired direction. This tilting of the rotor is effected by tilting the swash plate, which results in a "cyclic pitch control" of the blades, in which the pitch of each of the blades changes twice, i.e., one pitch cycle, per revolution of the hub. For example, to move the aircraft directly forward, the pitch, or angle of attack, of each blade is increased each time that blade passes over the tail of the aircraft, such that the lift developed by that blade is then temporarily greater than that of the other blades, and thereby results in a forward thrust component being applied to the aircraft by the rotor.

As a result of the foregoing method of operation and the effect of the relative speed of the aircraft moving through air, conventional rotor aircraft have a limited forward air speed, viz., about 180 knots (~207 mph), due to the blade tip speed approaching the speed of sound on the advancing blade, and a stall condition occurring on the retreating blade. Additionally, when these limiting conditions are being approached, large vibrations begin to occur in the rotor, which causes component fatigue and increased pilot mental and physical work load. The vibrations cause the entire vehicle, including the pilot and aircraft cockpit controls, to shake and the aircraft displays to become blurred.

One effort to address the foregoing problem has been the development of so-called "tilt rotor" aircraft to provide enhanced helicopter lift capability, higher forward airspeed and reduced vibration. However, this approach adds wings, aero-surface controls, complex rotor conversion mechanisms, weight and cost.

In another approach, rotor aircraft designs have been developed implementing so-called "compound" systems that have both conventional rotor systems and additional forward propulsion systems. These compound designs typically also include additional lifting surfaces and aero-surface controls, which add significant complexity, weight and cost to the aircraft.

In a third approach, individual blade control (IBC) is used in conjunction with a lower rotor speed and "reverse rotor flow" technology. IBC systems enable the direction of pitch of each blade to be varied independently of the others and more than twice per revolution of the hub, as occurs in conventional rotor aircraft. EBC also enables the rotor system track and balance procedure to be implemented in software, thereby eliminating the time consuming process of manually adjusting the length of each pitch link. Typical approaches to IBC utilize either electrical motor actuators and slip rings, or hydraulic actuators, hydraulic swivels and electrical slip rings. Both approaches are complicated, add extensive installation congestion in the rotating section of the rotor system, and significantly reduce control reliability of the "flight critical" rotor system. The electric approach utilizes a screw mechanism that is susceptible to jamming and is dependent on slip ring technology, which is unreliable. Furthermore, lightening strike attachment to the rotor hub is a common occurrence and may completely eliminate all electrical control. The hydraulic approach is dependant on both electrical and hydraulic slip ring technology, neither of which is reliable. The lightening strike problem also exists with this design. External hydraulic leaks are centrifugally distributed onto numerous aircraft components, including the exterior body and windshield and require extensive clean up. The mass of the rotating power control actuators also introduces new stresses into the flight critical rotor system.

In light of the foregoing problems, there is a long felt but as yet unsatisfied need in the field of rotor aircraft for a simpler, substantially more reliable, less expensive and lighter weight mechanism for providing individual blade control (IBC) for the rotor(s) of a rotor aircraft.

BRIEF SUMMARY

In accordance with the exemplary embodiments thereof described herein, the present invention provides a mechanical individual blade control (MIBC) mechanism for rotor blade systems and the main rotor(s) of a rotor aircraft, such as a helicopter, that affords a simpler, more reliable, higher harmonic individual blade control technique, enables a higher rotor aircraft speed to be achieved when used in conjunction with reverse flow rotor techniques (i.e., slowed rotor speed combined with multiple blade pitch changes), results in substantially reduced vibration at either high or low speeds while avoiding the overall design complexity of the prior art IBC mechanisms, and provides a technique for effecting automatic rotor system track and balance.

In one exemplary embodiment thereof, the novel MIBC mechanism comprises an elongated tubular rotor mast having a long axis, an upper end coupled to a hub of the rotor for conjoint rotation therewith, and a lower end coupled to and rotationally driven by an engine of the aircraft. A plurality of pitch tubes equal in number to the number of blades of the rotor are disposed coaxially within the rotor mast and fixed against conjoint rotation therewith. An actuator is coupled to a lower end of an associated one of each of the pitch tubes, each actuator being operable to selectably move the associated pitch tube up and down in the axial direction independently of the other pitch tubes. A pitch plate is disposed at an upper end of an associated one of each of the pitch tubes for conjoint rotation with the rotor mast. Each pitch plate has an inner periphery that is coupled to the upper end of the associated pitch tube for both conjoint axial movement therewith and rotational movement relative thereto, and an outer periphery that is coupled to an inner surface of the rotor mast for both conjoint rotation therewith and axial movement relative thereto. An elongated pitch link has a lower end fixed to an associated one of each of the pitch plates for conjoint axial and rotational movement therewith, and an upper end coupled to a pitch horn disposed at an inner end of an associated one of the blades of the rotor.

In another exemplary embodiment, a method for controlling the pitch of each of the blades of an aircraft rotor thrust system comprises coupling an upper end of an elongated annular rotor mast to a hub of the rotor system for conjoint rotation therewith, rotationally driving a lower end of the rotor mast, disposing a plurality of mechanical linkages within the annulus of the rotor mast, providing a plurality of actuators below the hub of the rotor, each actuator being operable to selectively control the pitch of an associated one of the blades independently of the other blades, coupling each of the linkages between an associated one of the blades and an associated one of the actuators, each linkage being operable to transmit a force output by the associated actuator to a pitch horn fixed to an inner end of the associated blade, and controlling the pitch of each blade of the rotor system independently of the other blades with the associated actuator.

In another exemplary embodiment, a rotor aircraft comprises a fuselage and a main rotor rotatably coupled to the fuselage. The rotor includes a rotatable hub that is rotationally driven by an engine, and a plurality of blades extending radially outward therefrom. Each of the blades has an inner end coupled to the hub for rotation of the blade about each of three mutually perpendicular axes relative to the hub. An upper end of an elongated annular rotor mast is coupled to the hub for conjoint rotation therewith, and a lower end of the mast is coupled to and rotationally driven by the engine. A plurality of actuators are disposed in the fuselage below the hub. Each actuator is operable to selectively control the pitch of an associated one of the blades independently of the other blades. A plurality of mechanical linkages are disposed within the annulus of the rotor mast. Each linkage is coupled between a pitch horn fixed to an inner end of an associated one of the blades and an associated one of the actuators and is operable to transmit a force output by the associated actuator to the associated blade to change its pitch independently of the other blades.

In one preferred embodiment, the pitch tubes are disposed concentrically within the rotor mast, and the outer periphery of each pitch plate is coupled to the inner surface of the rotor mast by a slider mechanism disposed at the outer periphery of the pitch plate and engaged in an axial slot or spline in the inner surface of the rotor mast for both conjoint rotation therewith and for relative sliding axial movement therein. The inner periphery of each pitch plate is coupled to the upper end of the associated pitch tube by a bearing coupled between the inner periphery of the pitch plate and the upper end of the pitch tube so as to enable both conjoint axial movement therewith and rotational movement relative thereto.

In another preferred exemplary embodiment, the aircraft includes a gearbox having an opening therethrough, with the lower end of the rotor mast extending into the gearbox and the mechanical linkages extending through the opening in the gearbox such that an upper end of each of the linkages is disposed above the gearbox and a lower end of each of the linkages is disposed below the gearbox, along with the actuators. This "hole-in-the box" arrangement provides a compact, protected mechanical control system design and locates the transmission closer to the rotating plane of the blades, thereby reducing rotor stresses, since the rotating plane of the blades can be located closer to the transmission wherein the rotor mast moments are reacted, and provides the power control elements in a stationary system that is easy to inspect and maintain. The robust annular rotor mast also serves to protect the flight critical linkages of the MIBC. The hole-in-the-box design also simplifies the pitch tube anti-rotation feature, as compared to a conventional "scissor" device.

The actuators of the MIBC mechanism can comprise either linear or rotary actuators, and further, may be either electromagnetic or hydraulic in operation. Additionally, for purposes of redundancy, a plurality of actuators may be coupled to a lower end of an associated one of the mechanical linkages, each of which is capable of selectably moving the associated linkage so as to effect pitch changes of the associated blade independently of the operation of the other actuators coupled to the linkage.

The use of the novel MIBC mechanism in combination with reverse rotor flow (slowed rotor speed, multiple blade pitch cycles per revolution), enables a more conventional rotor air-craft (i.e., a non-tilt rotor and no forward propulsion system) to 1) achieve a higher forward air-speed through use of a slowed rotor and reverse rotor flow techniques, 2) avoid the complications and weight of tilt rotor aircraft designs, 3) avoid the complication and weight of compound aircraft designs, and 4) provide higher harmonic controls to reduce vibration levels. The use of the novel MIBC in conjunction with conventional non-reverse flow rotor systems also provides: 1) a higher harmonic control (HHC) solution to reduce vibration, in that it enables the direction of pitch of each blade of the rotor to be changed more than twice, and indeed, as many times as desired, during a single revolution of the rotor hub, and 2) provides automatic rotor blade track and balance to reduce maintenance time.

A better understanding of the above and many other features and advantages of the novel MIBC mechanism of the invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
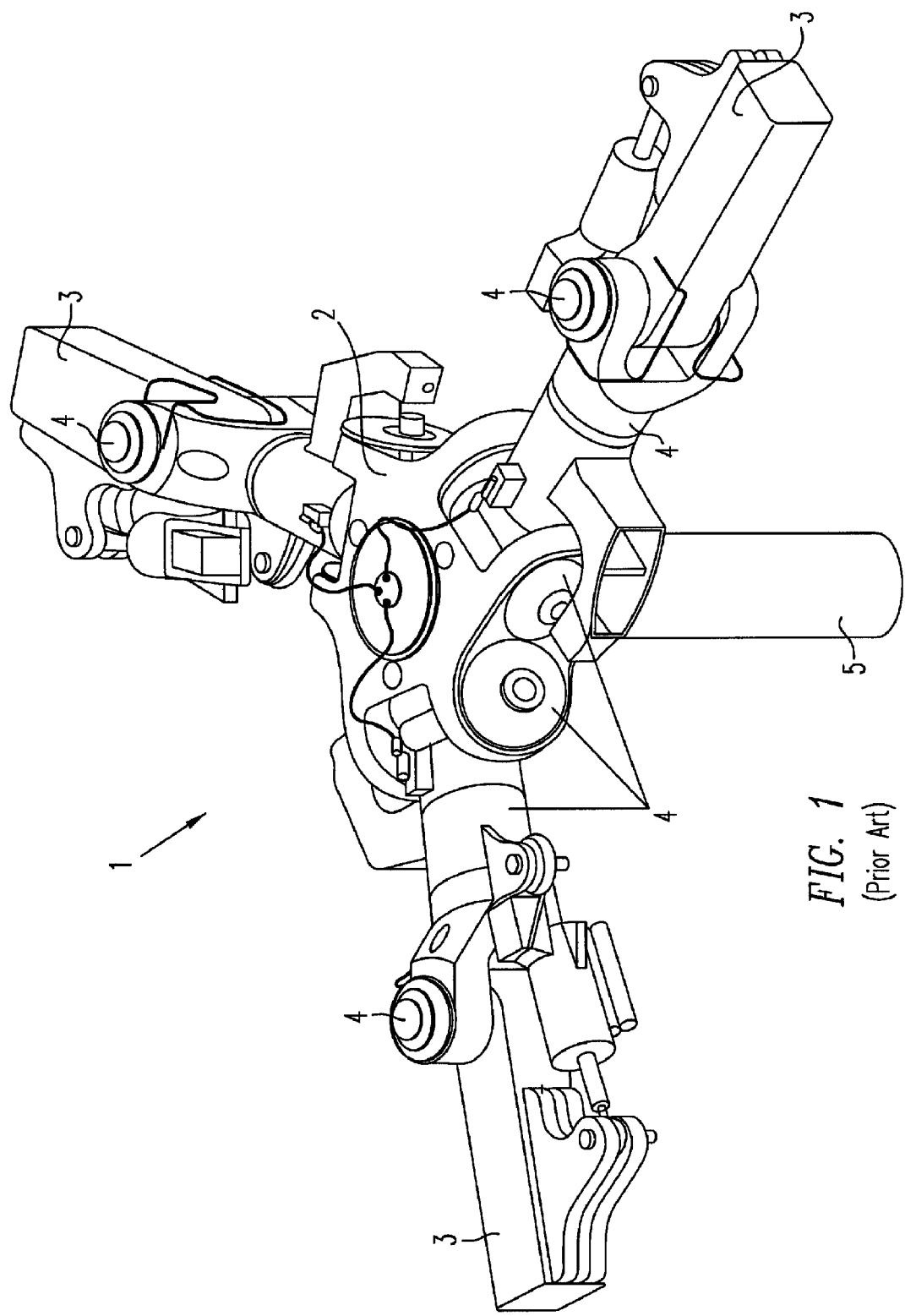
FIG. 1 is a partial perspective view of a main rotor of a rotor aircraft in accordance with the prior art.
Figure 2:
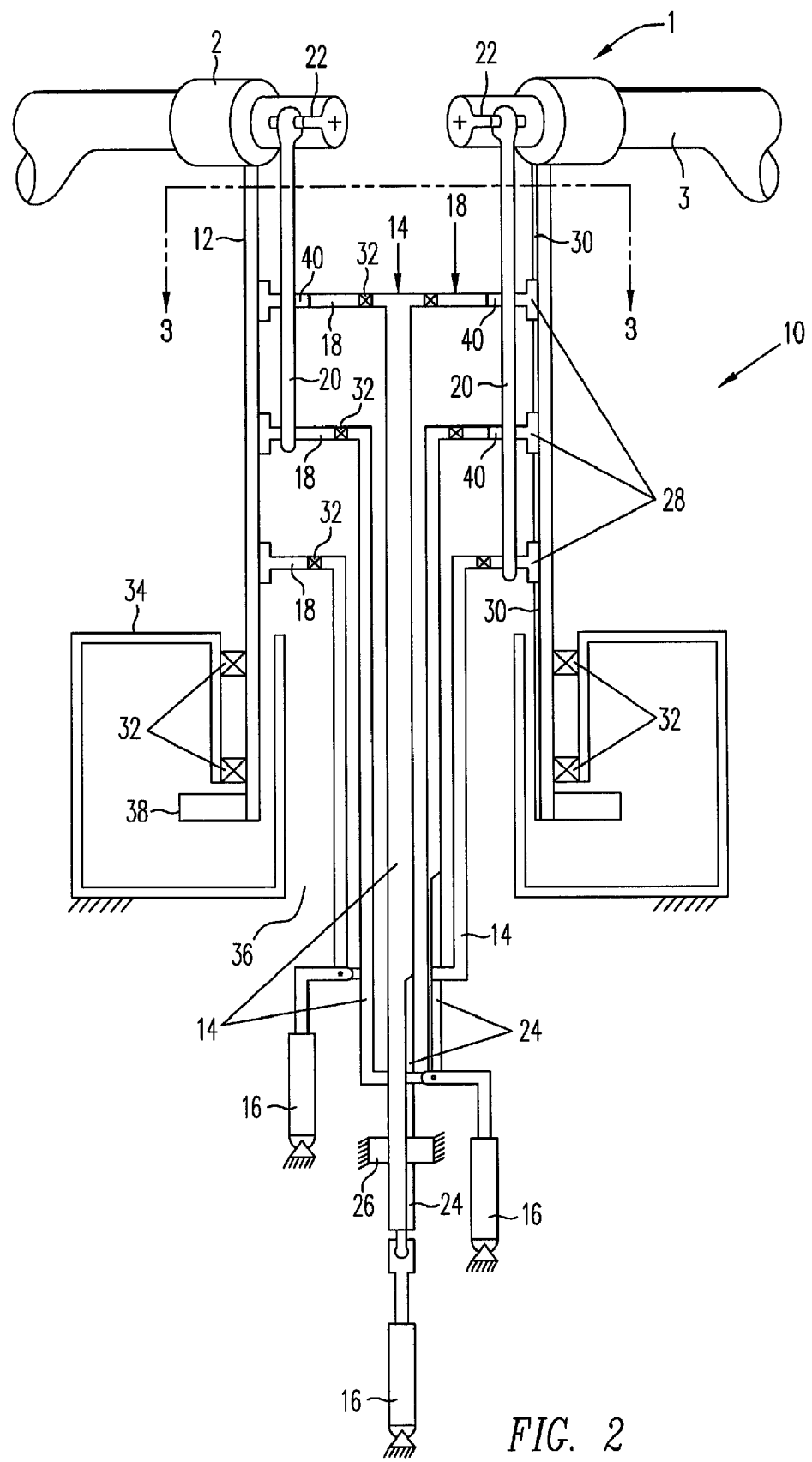
FIG. 2 is a partial cross-sectional view of a main rotor of a rotor aircraft incorporating an exemplary embodiment of a mechanical independent blade control (MIBC) mechanism in accordance with the present invention; and, FIG. 3 is a cross-sectional view of the MIBC mechanism of FIG. 2, as seen along the section lines 3-3 taken therein.
Figure 3:
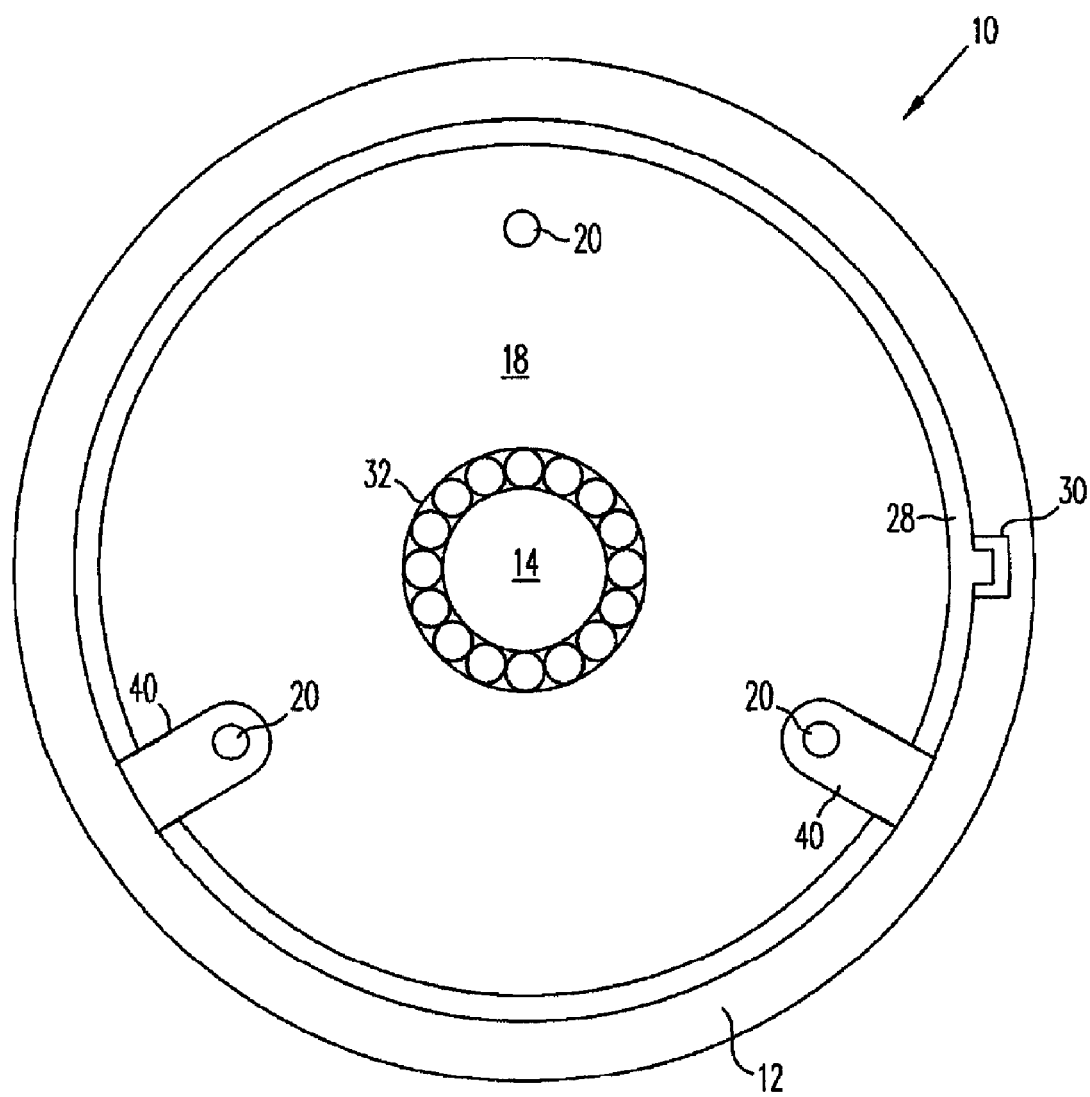

FIG. 2 is a partial cross-sectional view of a main rotor 1 of a rotor aircraft (not illustrated) incorporating an exemplary embodiment of a mechanical independent blade control (MIBC) mechanism 10 in accordance with the present invention, and FIG. 3 is a cross-sectional view of the MIBC mechanism 10 of FIG. 2, as seen along the section lines 3-3 taken in FIG. 2.

In accordance with the present invention, the MIBC 10 provides reliable higher harmonic individual blade control (IBC). The higher harmonic IBC solution, in turn, enables 1) a higher rotor aircraft speed when used in conjunction with reverse flow rotor techniques (i.e., slowed rotor speed, multiple blade pitch cycles per revolution) in a more conventional rotor aircraft design, 2) reduced vibration at high or low speeds in such aircraft designs while minimizing overall aircraft design complexity, thereby avoiding the complexity of tilt rotor aircraft designs and other compound aircraft designs that have addition of forward propulsion systems, and 3) automatic rotor blade track and balance.

As illustrated in FIGS. 2 and 3, the exemplary MIBC mechanism 10 comprises an elongated tubular rotor mast 12 having a long axis, an upper end coupled to the hub 2 of the rotor 1 for conjoint rotation therewith, and a lower end coupled to and rotationally driven by the engine (not illustrated) of the aircraft, typically a gas turbine or piston engine. As illustrated in FIG. 2, a plurality of pitch tubes 14, which are equal in number to the number of blades 3 of the rotor, are disposed coaxially within the rotor mast and fixed against conjoint rotation therewith in the manner described in more detail below. In the particular exemplary embodiment of FIGS. 2 and 3, the main rotor 1 includes 3 blades, but it should be understood that the MIBC mechanism 10 can be used with rotors having either a fewer or a greater number of blades.

An actuator 16 is coupled to a lower end of an associated one of each of the pitch tubes 14. Each of the actuators is operable to selectably move the associated pitch tube back and forth in the axial direction, i.e., up and down, within the rotor mast 12 independently of the other pitch tubes. A pitch plate 18 is disposed at an upper end of and generally perpendicular to an associated one of each of the pitch tubes 14 for conjoint rotation with the rotor mast 12, and to that end, each of the pitch plates 18 has an inner periphery that is coupled to the upper end of the associated pitch tube for conjoint axial movement therewith and for rotational movement relative thereto, and one or more shoes, or sliders 28, disposed on an outer periphery thereof that is coupled to an inner surface of the rotor mast 12 for conjoint rotation with, and for axial movement relative to, the rotor mast 12.

The mechanism 10 further includes a plurality of elongated pitch links 20, each having a lower end fixed to an associated one of the pitch plates 18 for conjoint axial and rotational movement therewith, and an upper end coupled to a pitch horn 22 disposed at an inner end of an associated one of each of the blades 3 of the rotor 1.

In the particular exemplary embodiment of FIGS. 2 and 3, each of the pitch tubes 14 includes an anti-rotation feature 24, such as an axial slot or spline, disposed at a lower end portion thereof. A corresponding anti-rotation device 26 having one or both ends coupled to structure of the aircraft (not illustrated) extends through the anti-rotation feature of the innermost one of the pitch tubes 14, and each of the other pitch tubes 14 includes a portion that extends through the anti-rotation feature 24 of the innermost pitch tube 14 such that each of the pitch tubes 14 is thereby fixed against conjoint rotation with the rotor mast 12. The anti-rotation features serve to provide lateral support to the lower ends of the pitch tubes 14, and additionally, serve to fix the pitch tubes against conjoint rotation with the rotor mast 12. As will be appreciated by those of skill in the art, this lateral support and anti-rotation feature can be supplied by mechanisms other than the exemplary mechanisms described above and illustrated herein.

To effect conjoint rotation of the pitch plates 18 with the rotor mast 12 and still enable them to move axially within the annulus of the mast 12, the outer periphery of each of the pitch plates 18 is coupled to the inner surface of the rotor mast 12 by one or more sliders 28 disposed at the outer periphery of the pitch plate 18 and engaged in a corresponding axial slot or spline 30 in the inner surface of the rotor mast 12 for relative axial sliding therein. As illustrated in FIG. 3, the inner periphery of each pitch plate 18 is coupled to the upper end of the associated pitch tube 14 by a bearing 32 that is coupled between the inner periphery of the pitch plate 18 and the upper end of the pitch tube 14 so as to enable both conjoint axial movement with, and rotational movement relative to, the associated pitch tube 14. The bearings 32 are thus adapted to enable the associated pitch plate 18 to rotate relative to the associated pitch tube, while enabling axial forces to be transmitted from the pitch tubes 14 to the respective associated pitch plates 18.

In the particular exemplary embodiment illustrated in FIG. 2, the aircraft includes a stationary gearbox 34 having an opening 36 extending vertically therethrough. The lower end of the rotor mast 12 extends into the gearbox 34 and is coupled therein to and rotationally driven by a rotor gear 38 coupled through a transmission (not illustrated) to the engine (not illustrated) of the aircraft. Additional sets of bearings 32 disposed between the rotor mast 12 and the gearbox 34 enable the rotor to rotate relative to the gearbox 34. As illustrated in FIG. 2, the pitch tubes 14 extend through the opening in the gearbox such that the pitch plates 18 and the pitch links 20 are disposed above the actuators 16, whereas, the lower ends of the pitch tubes 14 and the actuators 16 are disposed below the gearbox 34 in the fuselage of the aircraft. This arrangement, referred to herein as a "hole-in-the box" design, provides a mechanical control system that is compact and well protected, locates the transmission closer to the plane of rotation of the blades 3, thereby reducing the stresses acting on the rotor 1 (since the rotating plane of the blades 3 can be located closer to the transmission wherein the rotor mast 12 moments are reacted), and disposes the power control elements in a stationary system that is easy to inspect and maintain, and simplifies the design of the pitch tube anti-rotation feature 24. The robust annular rotor mast 12 of the mechanism 10 also serves to protect the flight critical linkages of the MIBC 10.

The actuators 16 of the MIBC mechanism can comprise either linear or rotary actuators, and moreover, may be either electromagnetic or hydraulic in their operation. Additionally, for purposes of redundancy, a plurality of actuators may be coupled to a lower end of an associated one of each of the pitch tubes 14, each of which is capable of selectably moving the associated pitch tube so as to effect the necessary pitch changes of the associated blade 3 independently of the operation of the other actuators coupled to that pitch tube.

As illustrated in FIGS. 2 and 3, the pitch plates 18 are disposed one above the other, and accordingly, lower ones of the pitch links 20 are arranged to extend through openings 40 in upper ones of the pitch plates to enable a free axial movement thereof. In the particular exemplary embodiment of FIGS. 2 and 3, the rotor 1 incorporates 3 blades, and accordingly, the lowermost pitch link extends upward from the lowermost pitch plate and through corresponding openings 40 in the middle and uppermost pitch plates, and the middle pitch link extends upward from the middle pitch plate through another corresponding opening 40 in the uppermost pitch plate.

Referring to FIG. 2, in operation, the stationary, centrally located power actuator 16 moves up and down. Vertical forces are transmitted into the associated, non-rotating central pitch tube 14, bearing 32, and then into the rotating pitch plate 18. As the pitch plate is moved up and down by the pitch tube 14, it transfers force into the associated blade 3 via the associated pitch link 20, which is coupled to the associated pitch horn 22. (Since FIG. 2 is a cross-sectional view, only two pitch links 20 and pitch horns 22 are seen therein, as a third pitch link 20, pitch horn 22 and associated blade extending outward from the page are not visible.) The pitch horn 22 converts the linear motion of the pitch link into rotational pitch movement of the associated blade 3, which is rotatably coupled to the hub 2 of the rotor 1, about the long axis of the blade.

As discussed above, the innermost pitch tube 14 has an anti-rotation feature 24, such as a slot or spline, that laterally supports the pitch tube and reacts the frictional torque developed by the rotating bearings 32. Each of the other pitch tubes also incorporates an anti-rotation feature that engages the innermost pitch tube. The anti-rotation feature of the innermost pitch tube also provides lower lateral support for the other pitch tubes. The rotating sliders 28 on the outer race of each pitch plate provide upper lateral support to the pitch tubes. The sliders 28 are engaged in corresponding slots or splines 30 in the inner surface of the rotor mast 12. This arrangement enables the relative positions of the respective upper and lower ends of the pitch links 20 to be maintained synchronously.

As will be appreciated from the foregoing description, the novel MIBC mechanism 10 utilizes an independent power actuator 16 and an affiliated mechanical control path, or linkage, to control each blade 3 of the rotor independently of the others. These mechanical linkages include independent pitch plates 14 (instead of a single swashplate) to individually control the pitch of each rotor blade. This approach enables the lower reliability and redundant power control components to be kept in the stationary (i.e., non-rotating) system, and enables the use of only high reliability mechanical components to transmit control forces into the rotating rotor system, thereby providing a higher degree of reliability of control of the rotary system. The power control actuators 16 move the bearing-supported pitch tubes 14 up and down within the stationary system. The pitch tubes 14, in turn, move the bearing-supported pitch plates 18 up and down, which enables the control forces to be reliably transmitted into the rotating system. The rotating outer race of each pitch plate thus controls the pitch link 20 and its associated blade 3 independently of the other mechanical linkages.

The use of the novel MIBC mechanism 10 in combination with a slowed rotor and reverse rotor flow (multiple blade pitch cycles per revolution), enables a conventional rotor aircraft (i.e., one with a non-tilt rotor and no forward propulsion system) to achieve a higher forward air-speed, avoid the complications and weight of tilt rotor and compound aircraft designs, and provides higher harmonic controls to reduce vibration levels. The MIBC also provides a higher harmonic control (HHC) and automatic rotor system track and balance solutions for use on conventional, i.e., non-reverse flow rotor systems that reduces vibration at the upper speed limit and reduces maintenance time. Thus, while conventional rotor blade control is limited to a single pitch cycle, i.e., one up and down cycle, per revolution of the hub, due to the use of a single swashplate design, the MIBC mechanism 10 of the present invention provides independent higher frequency control for each blade, e.g., two or even more pitch cycles per revolution.

The MIBC mechanism 10 thus provides the benefits of IBC while avoiding the problems with electrical and hydraulic IBC systems, minimizes the total number of components, provides the necessary rotor system reliability needed for helicopter "flight critical" rotor control and offers excellent maintainability characteristics.

By now, those of skill in this art will appreciate that many modifications, substitutions and variations can be made in and to the MIBC mechanism of the present invention without departing from its spirit and scope. In light of this, the scope of the present invention should not be limited to that of the particular embodiments illustrated and described herein, as they are only exemplary in nature, but instead, should be fully commensurate with that of the claims appended hereafter and their functional equivalents.

What is claimed is:

1. A mechanism for controlling the pitch of each of the blades of an aircraft rotor thrust system independently of the other blades thereof, comprising:
   an elongated tubular rotor mast having a long axis, an upper end coupled to a hub of the rotor for conjoint rotation therewith, and a lower end coupled to and rotationally driven by an engine of the aircraft;
   a plurality of pitch tubes equal in number to the number of blades of the rotor disposed coaxially within the rotor mast and fixed against conjoint rotation therewith;
   an actuator coupled to a lower end of an associated one of each of the pitch tubes, each being operable to selectably move the associated pitch tube back and forth in the axial direction independently of the other pitch tubes;
   a pitch plate disposed at an upper end of an associated one of each of the pitch tubes for conjoint rotation with the rotor mast, each having an inner periphery coupled to the upper end of the associated pitch tube for both conjoint axial movement therewith and rotational movement relative thereto, and an outer periphery coupled to an inner surface of the rotor mast for both conjoint rotation therewith and axial movement relative thereto; and,
   an elongated pitch link having a lower end fixed to an associated one of each of the pitch plates for conjoint axial and rotational movement therewith, and an upper end coupled to a pitch horn disposed at an inner end of an associated one of the blades of the rotor.

2. The mechanism of claim 1, further comprising a mechanism disposed at a lower end portion of each of the pitch tubes for providing lateral support to the lower end portion of the pitch tube and for fixing the pitch tube against conjoint rotation with the rotor mast.

3. The mechanism of claim 1, wherein the outer periphery of each of the pitch plates is coupled to the inner surface of the associated rotor mast by a slider disposed at the outer periphery of the pitch plate and slidably engaged in an axial slot in the inner surface of the rotor mast for both conjoint rotation therewith and for relative sliding axial movement therein.

4. The mechanism of claim 1, wherein the inner periphery of each of the pitch plates is coupled to the upper end of the associated pitch tube by a bearing coupled between the inner periphery of the pitch plate and the upper end of the pitch tube so as to enable both conjoint axial movement therewith and rotational movement relative thereto.

5. The mechanism of claim 1, wherein:
   the aircraft includes a gearbox having an opening therethrough;
   the lower end of the rotor mast extends into the gearbox; and,
   the pitch tubes extend through the opening in the gearbox such that the pitch plates and the pitch links are disposed above the actuators and the lower ends of the pitch tubes and the actuators are disposed below the gearbox.

6. The mechanism of claim 1, wherein the actuators comprise linear or rotary actuators.

7. The mechanism of claim 1, wherein the actuators are driven electrically or hydraulically.

8. The mechanism of claim 1, further comprising a plurality of redundant actuators coupled to the lower end of an associated one of each of the pitch tubes, each being capable of selectably moving the associated pitch tube back and forth in the axial direction independently of the operation of the other actuators coupled thereto.

9. The mechanism of claim 1, wherein the pitch plates are disposed one above the other, with the lower pitch links extending through openings in the upper pitch plates.

10. A rotor thrust system for an aircraft, comprising:
at least one main rotor having a hub and a plurality of blades coupled thereto; and, the blade pitch control mechanism of claim 1 coupled to the hub and the blades of the rotor and controlling the pitch of each of the blades independently of the other blades.

11. A helicopter incorporating the rotor thrust system of claim 10.

12. A method for controlling the pitch of each of the blades of an aircraft rotor thrust system, the method comprising:
coupling an upper end of an elongated annular rotor mast to a hub of the rotor system for conjoint rotation therewith;
rotationally driving a lower end of the rotor mast;
disposing a plurality of mechanical linkages within the annulus of the rotor mast;
providing a plurality of actuators below the hub of the rotor, each actuator being operable to selectively control the pitch of an associated one of the blades independently of the other blades; and,
coupling each of a plurality of mechanical linkages between an associated one of the blades and an associated one of the actuators, each linkage being operable to transmit a force output by the associated actuator to a pitch horn fixed to an inner end of the associated blade; and,
controlling the pitch of each blade of the rotor system independently of the other blades with the associated actuator.

13. The method of claim 12, wherein controlling the pitch of the blades comprises changing the direction of pitch of each blade more than twice during a single revolution of the hub.

14. A rotor aircraft, comprising:
a fuselage;
a main rotor rotatably coupled to the fuselage, the rotor including a rotatable hub and a plurality of radially extending blades, each having an inner end coupled to the hub for rotation of the blade about each of three mutually perpendicular axes relative to the hub;
an engine for rotatably driving the hub;
an elongated annular rotor mast having a long axis, an upper end coupled to the hub for conjoint rotation therewith, and a lower end coupled to and rotationally driven by the engine; and,
a mechanical individual blade control (MIBC) mechanism for controlling the pitch of each of the blades of the rotor independently of the other blades during rotation of the hub, the MIBC comprising:
a plurality of actuators equal in number to the number of blades of the rotor disposed in the fuselage below the hub, each being operable to selectively control the pitch of an associated one of the blades independently of the other blades; and,
a plurality of mechanical linkages disposed within the annulus of the rotor mast, each linkage being coupled between an associated one of the blades and an associated one of the actuators and operable to transmit a force output by the associated actuator to a pitch horn fixed to an inner end of the associated blade.

15. The rotor aircraft of claim 14, wherein each mechanical linkage comprises:
a pitch tube disposed within the rotor mast and fixed against conjoint rotation therewith;
a pitch plate disposed at an upper end of the pitch tube for conjoint rotation with the rotor mast and having an inner periphery coupled to the upper end of the pitch tube for both conjoint axial movement therewith and rotational movement relative thereto, and an outer periphery coupled to an inner surface of the rotor mast for both conjoint rotation therewith and axial movement relative thereto; and,
an elongated pitch link having a lower end fixed to the pitch plate for conjoint axial and rotational movement therewith, and an upper end coupled to the pitch horn of the associated blade of the rotor.

16. The rotor aircraft of claim 15, wherein the pitch tubes are disposed concentrically within the rotor mast.

17. The rotor aircraft of claim 15, wherein the outer periphery of the pitch plate is coupled to the inner surface of the rotor mast by a slider disposed at the outer periphery of the pitch plate and engaged in an axial feature in the inner surface of the rotor mast for both conjoint rotation therewith and relative sliding axial movement therein.

18. The rotor aircraft of claim 15, wherein the inner periphery of the pitch plate is coupled to the upper end of the pitch tube by a bearing coupled between the inner periphery of the pitch plate and the upper end of the pitch tube so as to enable both conjoint axial movement therewith and rotational movement relative thereto.

19. The rotor aircraft of claim 14, wherein:
the aircraft includes a gearbox having an opening therethrough;
the lower end of the rotor mast extends into the gearbox; and,
the mechanical linkages extend through the opening in the gearbox such that an upper end of each of the linkages is disposed above the actuators and a lower end of each of the linkages is disposed below the gearbox.

20. The rotor aircraft of claim 14, wherein the actuators comprise linear or rotary actuators.

* * * * *